(12) United States Patent
Wang et al.

(10) Patent No.: US 12,352,358 B2
(45) Date of Patent: Jul. 8, 2025

(54) ELECTRIC VALVE

(71) Applicant: ZHEJIANG SANHUA AUTOMOTIVE COMPONENTS CO., LTD., Zhejiang (CN)

(72) Inventors: Ren Wang, Zhejiang (CN); Lixin Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 222 days.

(21) Appl. No.: 17/783,325

(22) PCT Filed: Dec. 8, 2020

(86) PCT No.: PCT/CN2020/134380
§ 371 (c)(1),
(2) Date: Jun. 8, 2022

(87) PCT Pub. No.: WO2021/115233
PCT Pub. Date: Jun. 17, 2021

(65) Prior Publication Data
US 2023/0010390 A1    Jan. 12, 2023

(30) Foreign Application Priority Data

Dec. 9, 2019   (CN) .......................... 201911250887.9
Dec. 9, 2019   (CN) .......................... 201911250889.8

(51) Int. Cl.
*F16K 31/02*   (2006.01)
*F16J 15/52*   (2006.01)
(Continued)

(52) U.S. Cl.
CPC .............. *F16J 15/52* (2013.01); *F16K 27/029* (2013.01); *F16K 27/12* (2013.01); *F16K 31/02* (2013.01); *F16K 41/12* (2013.01)

(58) Field of Classification Search
CPC .......... F16K 41/12; F16K 31/02; F16K 27/12; F16K 27/029; F16J 15/52
See application file for complete search history.

(56) References Cited

U.S. PATENT DOCUMENTS 3,868,890 A * 3/1975 Roberts ................. B60T 8/4225
                                                  91/401
9,261,055 B2 * 2/2016 Tsumoto ............ F02M 25/0836
(Continued)

FOREIGN PATENT DOCUMENTS

CN        201133471 Y     10/2008
CN        103185163 A      7/2013
(Continued)

OTHER PUBLICATIONS

Japanese Office Action dated Apr. 25, 2023 for Japanese Appl. No. 2022-524660.
(Continued)

*Primary Examiner* — Eugene G Byrd
(74) *Attorney, Agent, or Firm* — Ohlandt, Greeley and Perle, L.L.P.

(57) ABSTRACT

An electric valve, comprising a housing and an end cover. A cavity and a valve port are formed in the housing. The electric valve further comprises a rotor assembly, a rod assembly, and a valve core assembly; the rotor assembly is connected to one end of the rod assembly; and the other end of the rod assembly is connected to the valve core assembly. The electric valve further comprises a sealing component, and the sealing component is distant from the valve port with respect to the valve core assembly; the sealing component comprises a first cylindrical portion, a membrane portion, and an annular sealing portion; by providing the sealing component, the first cylindrical portion is connected to the rod assembly and a connection position is sealed.

19 Claims, 5 Drawing Sheets

(51) Int. Cl.
*F16K 27/02* (2006.01)
*F16K 27/12* (2006.01)
*F16K 41/12* (2006.01)

(56) References Cited

U.S. PATENT DOCUMENTS

| | | | |
|---|---|---|---|
| 10,234,041 B2* | 3/2019 | Kajio | F16K 1/12 |
| 10,571,029 B2* | 2/2020 | Kajio | F16K 1/36 |
| 2001/0017360 A1* | 8/2001 | Watanabe | F16K 41/12 |
| | | | 251/129.17 |
| 2013/0092860 A1 | 4/2013 | Kiku et al. | |
| 2014/0054479 A1 | 2/2014 | Shen | |
| 2017/0254432 A1 | 9/2017 | Rateick et al. | |
| 2017/0335973 A1 | 11/2017 | Kajio | |
| 2018/0073642 A1 | 3/2018 | Kajio | |
| 2018/0363783 A1 | 12/2018 | Kajio | |
| 2020/0232569 A1* | 7/2020 | Ward | F16K 31/0655 |
| 2020/0240539 A1 | 7/2020 | Lan et al. | |

FOREIGN PATENT DOCUMENTS

| | | |
|---|---|---|
| CN | 203809825 U | 9/2014 |
| CN | 204083438 U | 1/2015 |
| CN | 204512443 U | 7/2015 |
| CN | 108506504 A | 9/2018 |
| CN | 109424777 A | 3/2019 |
| JP | 59-152268 U | 10/1984 |
| JP | H0396780 A | 4/1991 |
| JP | H10122408 A | 5/1998 |
| JP | H1113604 A | 1/1999 |
| JP | 2001227671 A | 8/2001 |
| JP | 2001254865 A | 9/2001 |
| JP | 2018040486 A | 3/2018 |

OTHER PUBLICATIONS

International Search Report dated Feb. 23, 2021 for PCT Appl. No. PCT/CN2020/134227.
Extended European Search Report dated Nov. 8, 2023 for European Appl. No. 20897919.5.

* cited by examiner

ELECTRIC VALVE

This disclosure is a national phase application of PCT international patent application PCT/CN2020/134380, filed on Dec. 8, 2020, which claims priorities to the following two Chinese patent applications, both of which are incorporated herein by reference in their entireties, Chinese Patent Application No. 201911250887.9, titled "ELECTRIC VALVE", filed with the China National Intellectual Property Administration on Dec. 9, 2019; and 2) Chinese Patent Application No. 201911250889.8, titled "ELECTRIC VALVE", filed with the China National Intellectual Property Administration on Dec. 9, 2019.

BACKGROUND

1. Field of the Disclosure

The present application relates to the technical field of flow regulation, and in particular to an electric valve.

2. Discussion of the Background Art

An electric valve is widely used in fluid-medium pipeline systems and is configured to regulate the flow of medium. Taken the application of the electric valve in the automotive field as an example, the electric valve is applied in an air conditioning system, an engine cooling system, a battery cooling system or a fuel supply system.

The electric valve includes a valve core part movable relative to a housing, and the valve core part is driven by a driving portion. In some applications of the electric valve, the driving portion can be corroded by the fluid, and it is necessary to prevent the fluid in a valve cavity from leaking to the driving portion.

SUMMARY

An electric valve is provided according to the present solution, where the electric valve includes a housing and an end cover, a first cavity and a valve port are provided in the housing. The electric valve further includes a rotor assembly, a rod assembly and a valve core assembly. The rotor assembly is connected to one end of the rod assembly, and the other end of the rod assembly is connected to the valve core assembly. The electric valve further includes a sealing member, and the sealing member is away from the valve port with respect to the valve core assembly;

the sealing member includes a first cylindrical portion and a membrane portion, where the first cylindrical portion has a second through hole, another part of the rod assembly passes through the second through hole; the first cylindrical portion is connected to the rod assembly and a junction between the first cylindrical portion and the rod assembly is sealed, and an outer peripheral side of the membrane portion is sealed with the housing and/or the end cover.

By providing the sealing member, the first cylindrical portion is connected with respect to the rod assembly and the junction between the first cylindrical portion and the rod assembly is sealed, and the outer peripheral side of the membrane portion is sealed with the housing and/or the end cover, which can well prevent the fluid from contacting the rotor assembly and prevent the fluid from corroding the rotor assembly. In addition, the membrane portion is arranged without obstructing the rod assembly from moving up and down.

In a specific solution, the sealing member further includes an annular sealing portion, and the membrane portion is located between the annular sealing portion and the first cylindrical portion. The annular sealing portion is caught between the end cover and the housing, so that the annular sealing portion is in a compressed state, so as to well seal the housing and cover by the sealing portion.

DETAILED DESCRIPTION OF THE PREFERRED EMBODIMENTS

Embodiments are described in detail below with reference to the accompanying drawings.

Figure 1:
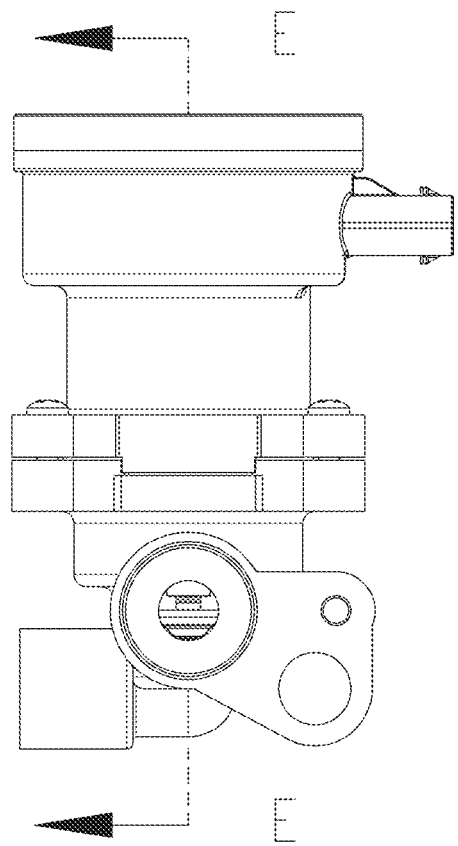
FIG. 1 shows a schematic front view of an embodiment of the present application.
Figure 2:
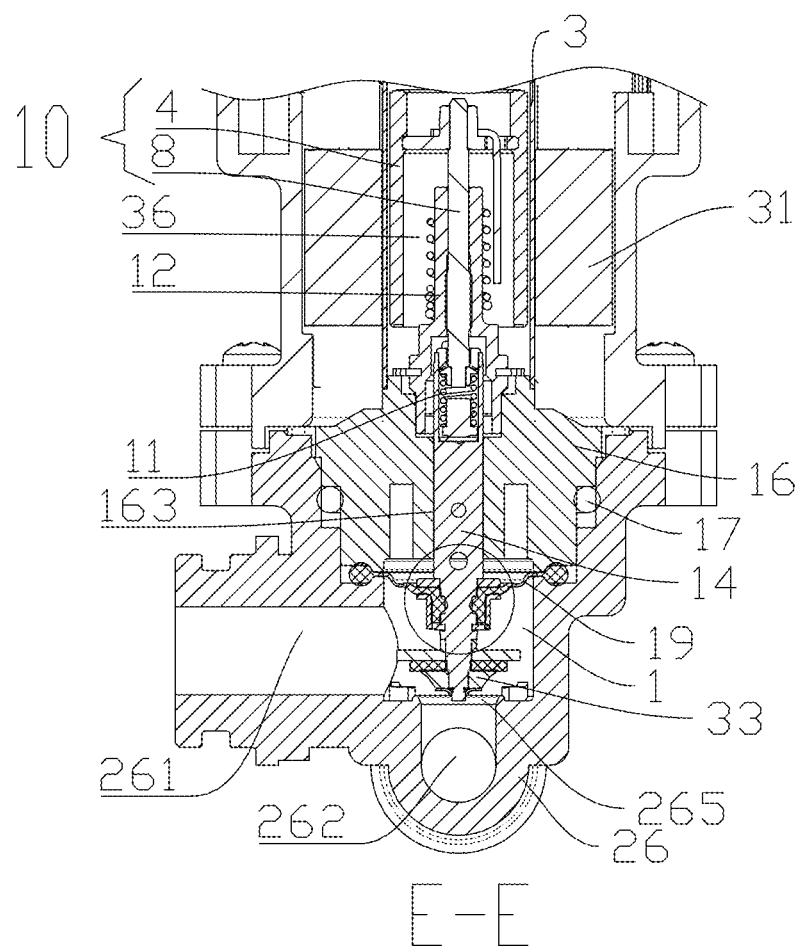
FIG. 2 shows a schematic partial cross-sectional view of an electric valve shown in FIG. 1 along the line E-E.

As shown in FIG. 2, the electric valve includes a housing 26 and an end cover 16, where a first cavity 1 and a valve port 265 are provided in the housing 26. The electric valve further includes a rod assembly 14 and a valve core assembly 33. One end of the rod assembly 14 is connected to the valve core assembly 33, and the other end of the rod assembly 14 is connected to a rotor assembly 10. The rod assembly 14 and the valve core assembly 33 can be moved up and down in an extending direction of the rod assembly 14 to open or close the valve port 265. The housing 26 includes a first passage 261 and a second passage 262, the first passage 261 is in communication with the first cavity 1, and the valve port 265 is configured to communicate the second passage 262 with the first cavity 1.

As shown in FIG. 2, the electric valve further includes a coil assembly 31 and a sleeve 3. The sleeve 3 is fixed to the end cover 16 and a junction between the sleeve 3 and the end cover 16 is sealed, and a second cavity 36 is formed inside of the sleeve 3, and at least a part of the rotor assembly 10 is arranged in the second cavity 36. The coil assembly 31 is sleeved on the sleeve 3. The end cover 16 includes a first through hole 163 penetrating the end cover 16. A part of the rod assembly 14 passes through the first through hole 163 of the end cover 16 and is drivingly connected to the rotor assembly 10. The rod assembly 14 is slidably fitted to an inner wall corresponding to the first through hole 163. The rotor assembly 10 further includes a screw rod 8 and a permanent magnet 4, a nut part 12 is threaded on the periphery of the screw rod 8, and the nut part 12 is screw-thread fitted to the screw rod 8. The nut part 12 is fixed to the end cover 16, and the screw rod 8 can move up and down with respect to the nut part 12, and the screw rod 8 is configured to drive the rod assembly 14 to move. An elastic member 11 is provided between the rod assembly 14 and the screw rod 8.

Figure 3:
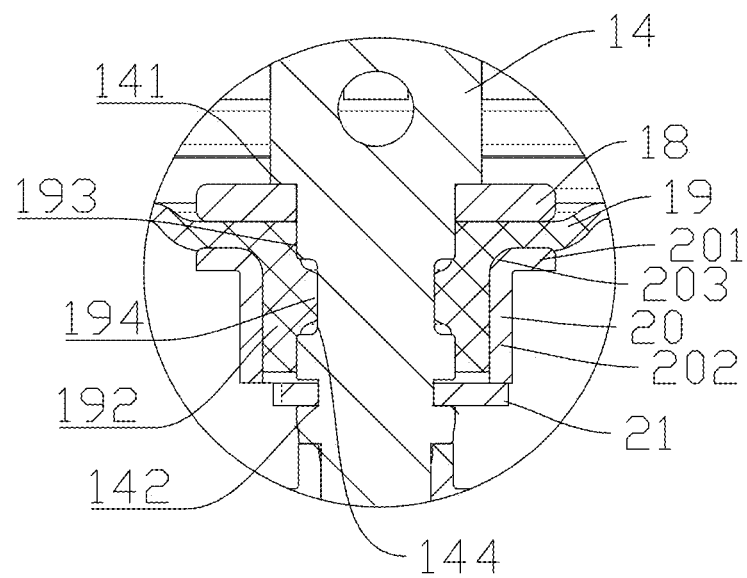
FIG. 3 shows a partial enlarged schematic view of the electric valve shown in FIG. 2.
Figure 4:
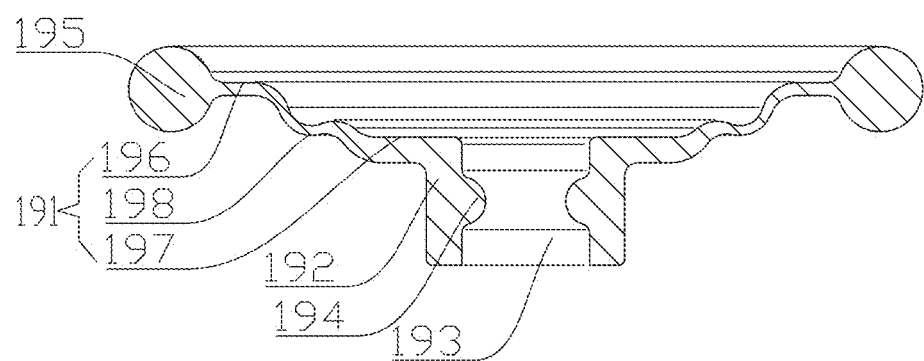
FIG. 4 shows a schematic cross-sectional view of a sealing member shown in FIG. 2.
Figure 5:
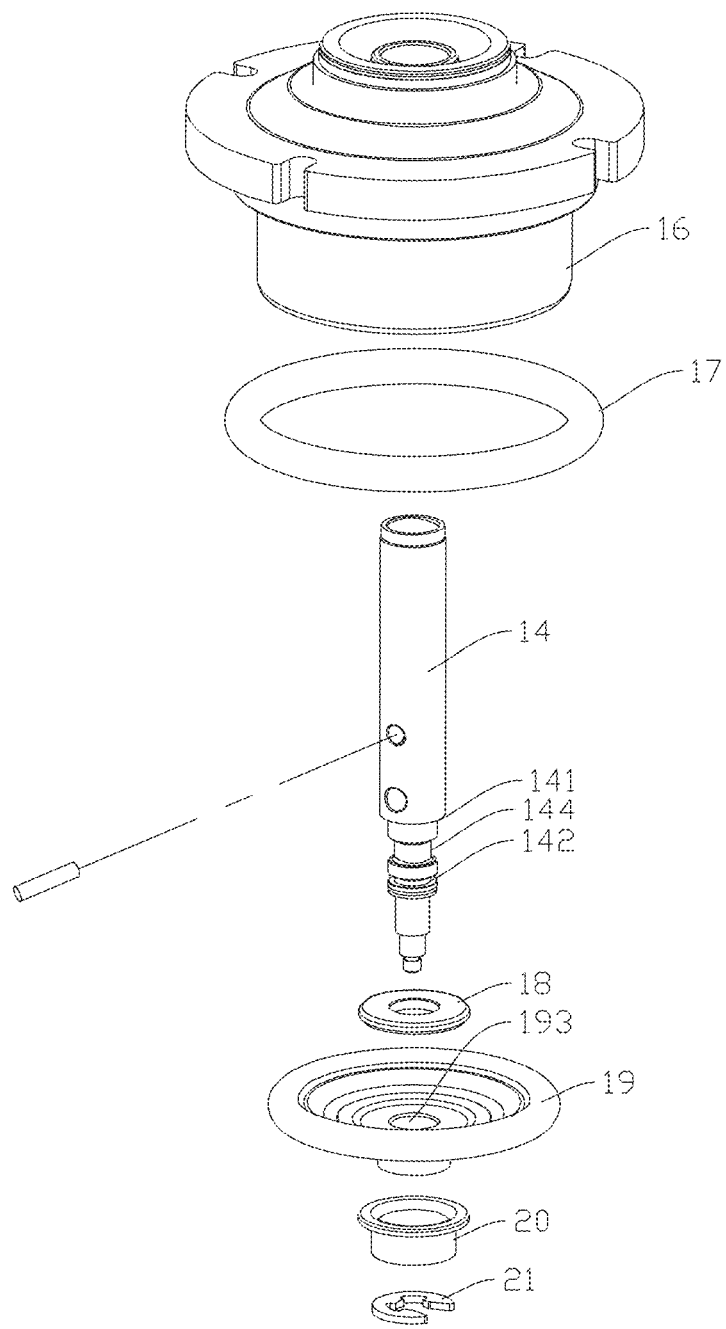
FIG. 5 shows a schematic explosive view of a part of the electric valve shown in FIG. 2.

The first passage 261 and the second passage 262 of the electric valve can be in communication with a pipeline of a fuel cell system with relatively higher pressure. In order to prevent the fluid with higher pressure in the first cavity 1 from entering the rotor assembly 10 or reduce leakage risk, as shown in FIG. 2 to FIG. 4, the electric valve further includes a sealing member 19, which is away from the valve port 265 with respect to the valve core assembly 33. The sealing member 19 includes a first cylindrical portion 192 and an annular membrane portion 191, the first cylindrical portion 192 is located on the inner peripheral side of the membrane portion 191, and the first cylindrical portion 192 includes a second through hole 193, and the other part of the rod assembly 14 passes through the second through hole 193 of the sealing member 19 and is connected to the valve core assembly 33. An outer peripheral side of the membrane portion 191 is connected to the housing 26 and the end cover 16, and junctions between them are sealed. The sealing member 19 may be made of rubber material or metal material, and the sealing member 19 has elasticity. As shown in FIG. 4, the membrane portion 191 includes a first flat portion 196 connected to an annular sealing portion 195, a second flat portion 197 connected to the first cylindrical portion 192, and a corrugated portion located between the first flat portion 196 and the second flat portion 197. The corrugated portion 198 is stretchable under external forces, so as to adapt to the up and down movement of the rod assembly 14. As shown in FIGS. 2 to 4, a part of the sealing member 19 in contact with the rod assembly 14 is stationary with respect to the rod assembly 14, and a part of the sealing member 19 in contact with the housing 26 is stationary with respect to the housing 26. Compared with dynamic sealing, static sealing can be adopted to reduce the risk of leakage. In other embodiments, the outer peripheral side of the membrane portion 191 may only be connected to the housing 26 or the end cover 16, and a junction between them is sealed.

As shown in FIG. 3 and FIG. 4, the electric valve further includes an annular jacket 20, the annular jacket 20 surrounds the outer periphery of the first cylindrical portion 192 and surrounds the second through hole 193. The first cylindrical portion 192 includes an outer wall portion and an inner wall portion located at an inner side of the second through hole 193, the inner wall portion and the outer wall portion are located on the inner and outer sides of the first cylindrical part 192, respectively. The annular jacket 20 and the outer wall portion of the first cylindrical portion 192 are in an interference fit, and the annular jacket 20 can exert a pressure on the cylindrical portion 192 towards the rod assembly 14, so that the first cylindrical portion 192 and the outer circumference of the rod assembly 14 are closely fitted, which can reduce leakage at the second through hole 193, thereby preventing the fluid with higher pressure in the first cavity 1 from entering the rotor assembly 10 in order to prevent the fluid from corroding the rotor assembly 10, and also prevent the fluid from entering the second cavity 36 and freezing at a low temperature, causing the rotor assembly 10 to fail to rotate.

As shown in FIGS. 2 to 3, the electric valve further includes a first position-limiting member 21, the first position-limiting member 21 is located at one end of the annular jacket 20 away from the first through hole 163, and the outer diameter of at least a part of the first position-limiting member 21 is greater than the inner diameter of the annular jacket 20. The first position-limiting member 21 abuts against the annular jacket 20, and the first position-limiting member 21 is fixed to the rod assembly 14, so that the end of the annular jacket 20 abutting against the first position-limiting member 21 is axially position limited. In this embodiment, the first position-limiting member 21 is a retaining ring. The rod assembly 14 has a groove 142 recessed in an outer peripheral surface of the rod assembly 14, the groove 142 corresponds to the first position-limiting member 21, and a part of the first position-limiting member 21 extends into the groove 142, so that the first position-limiting member 21 is axially position limited, and the other part of the first position-limiting member 21 extends outward in radial direction of the rod assembly 14 and abuts against an end of the sleeve 20. The retaining ring may be an E-shaped retaining ring, and the inner diameter of the retaining ring can vary, so that the retaining ring can pass through the thicker part of the rod assembly 14 to reach the groove 142 during installation. In other embodiments, the first position-limiting member 21 may also be a nut, and the first position-limiting member 21 can be fixed to the rod assembly 14 by internal threads. However, the structure of the retaining ring is simpler than that of the nut, and the cost is lower. In other embodiments, the first position-limiting member 21 may also be a part of the rod assembly 14.

As shown in FIG. 3, the electric valve further includes a second position-limiting member 18, the second position-limiting member 18 is located at an end of the sealing member 19 close to the first through hole 163, and the outer diameter of at least a part of the outer diameter of the second position-limiting member 18 is greater than the diameter of the second through hole 193. The sealing member 19 abuts against the second position-limiting member 18. The second position-limiting member 18 is fixedly connected to the rod assembly 14 or integrated with the rod assembly as a whole, so that an end of the first cylindrical portion 192 can be axially position limited. The second position-limiting portion 18 can be axially position limited by a fifth step portion 141 of the rod assembly 14. In other embodiments, the second position-limiting portion 18 may be a part of the rod assembly 14.

As shown in FIGS. 3 and 4, the annular jacket 20 includes an outer extension portion 201 extending outward in radial direction of the rod assembly 14 and a second cylindrical portion 202 extending axially along the rod assembly 14. The second cylindrical portion 202 is sleeved on the first cylindrical portion 192, and the outer diameter of the second position-limiting portion 18 is greater than the outer diameter of the second cylindrical portion 202. The second flat portion 197 of the membrane portion 191 is caught between the second position-limiting portion 18 and the outer extension portion 201, the outer extension portion 201 extending outward in radial direction of the rod assembly 14 and the second position-limiting member 18 can increase the area of a caught portion of the sealing member 19, and further reduce the deformation of the first cylindrical portion 192 caused by pulling while increasing the area of a sealing surface so as to reduce the leakage at the second through hole 193. The annular jacket 20 also has a horn-shaped flaring or chamfer 203 located at a junction between the outer extension portion 201 and the second cylindrical portion 202, and the horn-shaped flaring or chamfer 203 gradually expands toward the second position-limiting member 18. In case that the annular jacket 20 is not arranged on the outer periphery of the first cylindrical portion 192, the outer diameter of the first cylindrical portion 192 may be slightly greater than the inner diameter of the annular jacket 20, and the flaring or chamfer can be configured as a guide during inserting first cylindrical portion 192 into the annular jacket, so that the first cylindrical portion 192 can be more easily inserted into an inner side of the annular jacket 20. The chamfer can be rounded. The annular jacket 20 can be formed by pressing, which is lower in cost.

As shown in FIGS. 3 and 4, the sealing member 19 further includes an annular protrusion 194, which protrudes from an inner side of the first cylindrical portion 192 toward the rod assembly 114 and surrounds the rod assembly 14. The rod assembly 14 has an annular groove 144, which is recessed in an outer circumference of the rod assembly 14 and surrounds the rod assembly 14. The annular groove 144 corresponds to the annular protrusion 194, at least a part of the annular protrusion 194 extends into the annular groove 144, and the annular protrusion 194 abuts against the annular groove 144, so that not only the first cylindrical portion 192 can be axially position limited but also the sealing performance can be improved. In case that the first cylindrical portion 192 is not under pressure, a height of the annular protrusion 194 protruding from the inner side of the first cylindrical portion 192 is greater than a depth of the annular groove 144. In case that the first cylindrical portion 192 is sleeved on the outer periphery of the rod assembly 14, the annular protrusion 194 is in a compressed state, which could reduce the leakage at the second through hole 193. In other embodiments, the rod assembly 14 may also have an annular protrusion protruding from the outer peripheral surface of the rod assembly 14 and surrounding the rod assembly 14, and the sealing member 19 has an annular groove recessed in the inner side surface the first cylindrical portion 192 and surrounding the rod assembly 14. At least a part of the annular protrusion extends into the annular groove, and the annular protrusion abuts against the annular groove.

Figure 6:
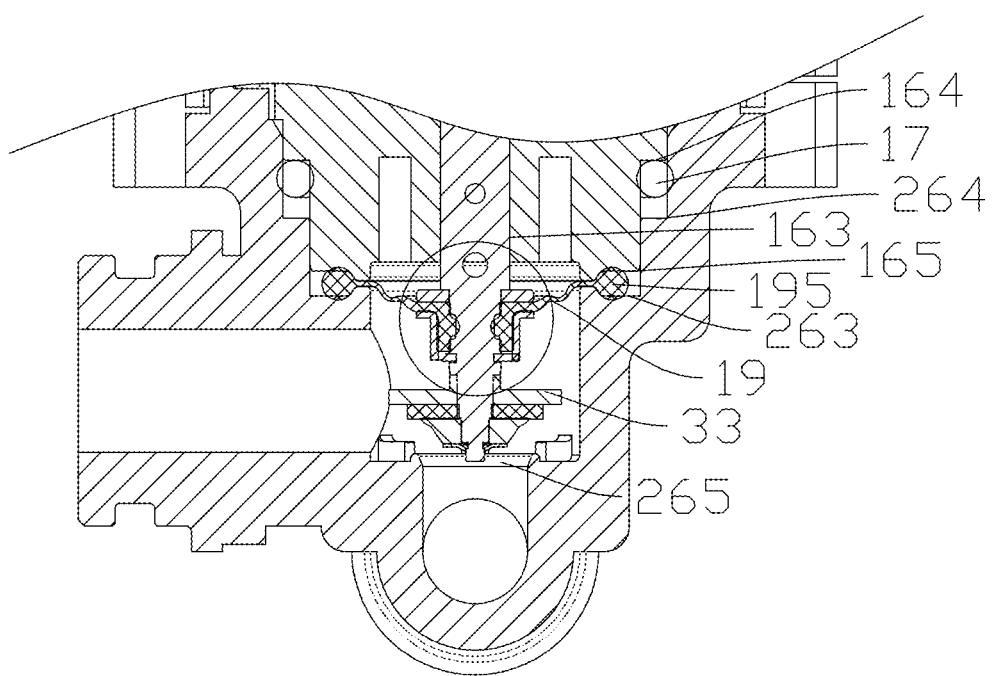
FIG. 6 shows a schematic partial enlarged view of the electric valve shown in FIG. 2.

As shown in FIGS. 4 and 6, the sealing member 19 further includes an annular sealing portion 195 located at the outer peripheral edge of the membrane portion 191. The annular sealing portion 195 surrounds the first through hole 163 of the end cover 16, and the thickness of the annular sealing portion 195 is greater than that of a junction between the membrane portion 191 and the annular sealing portion 195. The end cover 16 includes a first step portion 165, and the housing 26 includes a second step portion 263, where the first step portion 165 and the second step portion 263 both surround the first through hole 163. The first step portion 165 and the second step portion 263 are arranged opposite to each other, and an accommodating cavity is formed between the first step portion 165 and the second step portion 263. The annular sealing portion 195 is located between the first step portion 165 and the second step portion 263, and is in a compressed state, so that fluid leakage into the rotor assembly 10 from the first cavity 1 via the peripheral edge of the sealing member 19 is reduced. The annular sealing member 195 can also reduce fluid leakage from the first cavity 1 to the outside and/or the stator assembly 31 via a space between the end cover 16 and the housing 26. The first flat portion 196 is caught between the first step portion 165 and the second step portion 263, and the first flat portion 196 can be in a compressed state, which can further reduce leakage.

It can be seen that the sealing arrangements for at least one of the outer peripheral side of the membrane portion 191 of the sealing member 19, the housing 26 and the end cover 16 can just obtain the object of reducing the fluid leakage to the outside and/or the stator assembly 31 from the first cavity 1 via a space between the end cover 16 and the housing 26. Further, the membrane portion 191 can be stretchable, which will obstruct the vertical movement of the rod assembly 14 connected to the sealing member 19. In this embodiment, the outer periphery of the membrane portion 191 is further provided with an annular sealing portion 195, which is pressed in between the end cover 16 and the housing 26 so as to indirectly seal the end cover 16 and the housing 26 with the membrane portion 191. It should be understood that the outer peripheral side of the membrane portion 191 can also be directly connected to and sealed with the end cover 16 and the housing 26.

As shown in FIG. 6, the end cover 16 includes a third step portion 164, where the third step portion 164 corresponds to a fourth step portion 264 of the housing 26. The third step portion 164 and the fourth step portion 264 are arranged opposite to each other, and an accommodating cavity is formed there between. The electric valve further includes an annular sealing member 17, which is arranged between the third step portion 164 and the fourth step portion 264 and is in a compressed state. The third step portion 164 is away from the first cavity 1 with respect to the first step portion 165. The annular sealing member 17 can reduce external leakage of the first cavity 1 and form a double sealing with the annular sealing member 195. The end cover 16 can be welded and fixed to the housing 26, and a junction there between is sealed, and the external leakage of the first cavity 1 can be further reduced by welding.

The invention claimed is:

1. An electric valve, comprising a coil assembly, a sleeve, a nut part, a housing and an end cover, wherein a first cavity and a valve port are provided in the housing, the electric valve further comprises a rotor assembly, a rod assembly and a valve core assembly; the rotor assembly is connected to one end of the rod assembly, and the other end of the rod assembly is connected to the valve core assembly;

wherein a second cavity is provided in the sleeve, the rotor assembly is located in the second cavity and includes a screw rod and a permanent magnet, the nut part is threaded on the periphery of the screw rod, and the screw rod is moveable up and down with respect to the nut part to drive the rod assembly to move, characterized in that the end cover has a first through hole, and a part of the rod assembly passes through the first through hole and is slidably fitted with a corresponding inner wall of the first through hole, and the electric valve further comprises a sealing member, and the sealing member is away from the valve port with respect to the valve core assembly;

the sealing member comprises a first cylindrical portion and a membrane portion, wherein the first cylindrical portion has a second through hole, another part of the rod assembly passes through the second through hole; the first cylindrical portion is connected with respect to the rod assembly and a junction between the first cylindrical portion and the rod assembly is sealed, and an outer peripheral side of the membrane portion is sealed with the housing and/or the end cover.

2. The electric valve according to claim 1, wherein the sealing member further comprises an annular sealing portion, and the membrane portion is located between the annular sealing portion and the first cylindrical portion; the annular sealing portion is caught between the end cover and the housing, the annular sealing portion is in a compressed state, and the outer peripheral side of the membrane portion is sealed with the housing and the end cover.

3. The electric valve according to claim 1, wherein the outer peripheral side of the membrane portion is connected to the housing and/or the end cover, and a junction between the membrane portion and the housing and/or the end cover is sealed; the first cylindrical portion has a second through hole.

4. The electric valve according to claim 1, wherein another part of the rod assembly passes through the second through hole and the first cylindrical part is fixed or position-limited with respect to the rod assembly.

5. The electric valve according to claim 1, wherein the sealing member is made of rubber, and the thickness of an annular sealing portion is greater than the thickness of a junction between the membrane portion and annular sealing portion.

6. The electric valve according to claim 1, wherein the sealing member further comprises an annular protrusion, which protrudes from an inner side of the first cylindrical portion to the rod assembly and surrounds the rod assembly, the rod assembly has an annular groove recessed in an outer circumference of the rod assembly and surrounding the rod assembly, the annular groove corresponds to the annular protrusion, at least a part of the annular protrusion extends into the annular groove, the annular protrusion abuts against the annular groove, and the annular protrusion is in a compressed state; or, the sealing member has an annular groove recessed in an inner surface of the first cylindrical portion and surrounding the rod assembly, the rod assembly has an annular protrusion protruding from an outer circumference of the rod assembly and surrounding the rod assembly, at least a part of the annular protrusion extends into the annular groove, and the annular protrusion abuts against the annular groove.

7. The electric valve according to claim 1, wherein the electric valve further comprises an annular jacket, at least a part of the annular jacket is sleeved on the first cylindrical portion, and the annular jacket is in interference fit with an outer wall of the first cylindrical portion.

8. The electric valve according to claim 7, wherein the electric valve further comprises a first position-limiting member, the first position-limiting member is located at an end of the annular jacket away from the first through hole, the outer diameter of at least a part of the first position-limiting member is greater than the inner diameter of the annular jacket, a part of the first position-limiting member abuts against the annular jacket or the first cylindrical portion, and the first position-limiting member is fixed to the rod assembly or is formed as a part of the rod assembly.

9. The electric valve according to claim 8, wherein the electric valve further comprises a second position-limiting member, and the rod assembly passes through the second position-limiting member, the second position-limiting member is located at an end of the sealing member adjacent to the first through hole, and the outer diameter of at least a part of the second position-limiting member is greater than the diameter of the second through hole;
the second position-limiting member is fixed to the rod assembly or is formed as a part of the rod assembly, and the sealing member abuts against the second position-limiting member.

10. The electric valve according to claim 2, wherein the membrane portion comprises a first flat portion connected to the annular sealing portion, a second flat portion connected to the first cylindrical portion, and a corrugated portion located between the first flat portion and the second flat portion.

11. The electric valve according to claim 1, wherein the membrane portion comprises a first flat portion located at the outermost side, a second flat portion connected to the first cylindrical portion, and a corrugated portion located between the first flat portion and the second flat portion.

12. The electric valve according to claim 11, wherein the electric valve further comprises an annular jacket, at least a part of the annular jacket is sleeved on the first cylindrical portion, and the annular jacket is in interference fit with an outer wall of the first cylindrical portion;
the annular jacket comprises an outer extension portion extending in radial direction of the rod assembly and a second cylindrical portion extending axially along the rod assembly; the outer diameter of the second position-limiting member is greater than the outer diameter of the second cylindrical portion, and the second flat portion of the membrane portion is caught between the second position-limiting member and the outer extension portion.

13. The electric valve according to claim 10, wherein the end cover comprises a first step portion, the housing comprises a second step portion, the first step portion and the second step portion are arranged opposite to each other, and an accommodating cavity is formed between the first step portion and the second step portion; the annular sealing portion is located in the accommodating cavity, the first flat portion is caught between the first step portion and the second step portion, and the first flat portion is in a compressed state.

14. The electric valve according to claim 1, wherein the sleeve is fixed to the end cover, and a junction between the sleeve and the end cover is sealed;
one end of the first through hole is in communication with the first cavity, and the other end of the first through hole is in communication with the second cavity.

15. The electric valve according to claim 2, wherein the sealing member is made of rubber, and the thickness of an annular sealing portion is greater than the thickness of a junction between the membrane portion and annular sealing portion.

16. The electric valve according to claim 2, wherein the sealing member further comprises an annular protrusion, which protrudes from an inner side of the first cylindrical portion to the rod assembly and surrounds the rod assembly, the rod assembly has an annular groove recessed in an outer circumference of the rod assembly and surrounding the rod assembly, the annular groove corresponds to the annular protrusion, at least a part of the annular protrusion extends into the annular groove, the annular protrusion abuts against the annular groove, and the annular protrusion is in a compressed state; or, the sealing member has an annular groove recessed in an inner surface of the first cylindrical portion and surrounding the rod assembly, the rod assembly has an annular protrusion protruding from an outer circumference of the rod assembly and surrounding the rod assembly, at least a part of the annular protrusion extends into the annular groove, and the annular protrusion abuts against the annular groove.

17. The electric valve according to claim 2, wherein the electric valve further comprises an annular jacket, at least a part of the annular jacket is sleeved on the first cylindrical portion, and the annular jacket is in interference fit with an outer wall of the first cylindrical portion.

18. The electric valve according to claim 2, wherein the membrane portion comprises a first flat portion located at the outermost side, a second flat portion connected to the first cylindrical portion, and a corrugated portion located between the first flat portion and the second flat portion.

19. The electric valve according to claim 2, wherein the sleeve is fixed to the end cover, and a junction between the sleeve and the end cover is sealed;
one end of the first through hole is in communication with the first cavity, and the other end of the first through hole is in communication with the second cavity.

* * * * *